United States Patent
Jarvis (10) Patent No.: US 6,865,665 B2
(45) Date of Patent: Mar. 8, 2005

(54) PROCESSOR PIPELINE CACHE MISS APPARATUS AND METHOD FOR OPERATION

(75) Inventor: Anthony X. Jarvis, Acton, MA (US)

(73) Assignee: STMicroelectronics, Inc., Carrollton, TX (US)

( * ) Notice: Subject to any disclaimer, the term of this patent is extended or adjusted under 35 U.S.C. 154(b) by 723 days.

(21) Appl. No.: 09/751,331

(22) Filed: Dec. 29, 2000

(65) Prior Publication Data

US 2002/0087838 A1 Jul. 4, 2002

(51) Int. Cl.[7] .................................................. G06F 9/34

(52) U.S. Cl. ...................... 712/218; 711/141; 711/137; 711/138; 711/133

(58) Field of Search ............................... 712/218, 225; 711/137, 138, 141, 133

(56) References Cited

U.S. PATENT DOCUMENTS

| | | | | |
|---|---|---|---|---|
| 4,777,589 A | * | 10/1988 | Boettner et al. ................ | 710/3 |
| 4,851,993 A | | 7/1989 | Chen et al. .................. | 364/200 |
| 5,590,368 A | | 12/1996 | Heeb et al. .................. | 395/800 |
| 5,778,210 A | | 7/1998 | Henstrom et al. .......... | 395/394 |
| 6,012,137 A | | 1/2000 | Bublil et al. .................. | 712/36 |

FOREIGN PATENT DOCUMENTS

WO     WO 99/32979     7/1999

OTHER PUBLICATIONS

Hennessey, Computer Architecture a Quantative Approach, 1996, Morgan Kaufman Publishers, pp. 70–73 and 191–194.*
Bannon, Peter, et al.; "International Architecture of Alpha 21164 Microprocessor"; Digital Equipment Corporation; Published May 3, 1995; pp. 79–87.

* cited by examiner

Primary Examiner—Eddie Chan
Assistant Examiner—Tonia L. Meonske
(74) Attorney, Agent, or Firm—Lisa K. Jorgenson; William A. Munck (57) ABSTRACT

There is disclosed a data processor for stalling the instruction execution pipeline after a cache miss and re-loading the correct cache data into any bypass devices before restarting the pipeline. The data processor comprises: 1) an instruction execution pipeline comprising N processing stages, each of the N processing stages performing one of a plurality of execution steps associated with a pending instruction being executed by the instruction execution pipeline; 2) a data cache for storing data values used by the pending instruction; 3) a plurality of architectural registers for receiving the data values from the data cache; 4) bypass circuitry for transferring a first data value from the data cache directly to a functional unit in one of the N processing stages without first storing the first data value in a destination one of the plurality of architectural registers; and 5) a cache refill controller for detecting that a cache miss has occurred at a first address associated with the first data value, receiving a missed cache line from a main memory coupled to the data processor, and causing the first data value to be transferred from the missed cache line to the functional unit.

24 Claims, 5 Drawing Sheets

PROCESSOR PIPELINE CACHE MISS APPARATUS AND METHOD FOR OPERATION

CROSS-REFERENCE TO RELATED APPLICATIONS

The present invention is related to those disclosed in the following U.S. patent applications:

1) Ser. No. 09/751,372, filed concurrently herewith, entitled "SYSTEM AND METHOD FOR EXECUTING VARIABLE LATENCY LOAD OPERATIONS IN A DATA PROCESSOR";
2) Ser. No. 09/751,371, filed concurrently herewith, entitled "CIRCUIT AND METHOD FOR HARDWARE-ASSISTED SOFTWARE FLUSHING OF DATA AND INSTRUCTION CACHES";
3) Ser. No. 09/751,327, filed concurrently herewith, entitled "CIRCUIT AND METHOD FOR SUPPORTING MISALIGNED ACCESSES IN THE PRESENCE OF SPECULATIVE LOAD INSTRUCTIONS";
4) Ser. No. 09/751,377, filed concurrently herewith, entitled "BYPASS CIRCUITRY FOR USE IN A PIPELINED PROCESSOR";
5) Ser. No. 09/751,410, filed concurrently herewith, entitled "SYSTEM AND METHOD FOR EXECUTING CONDITIONAL BRANCH INSTRUCTIONS IN A DATA PROCESSOR";
6) Ser. No. 09/751,408, filed concurrently herewith, entitled "SYSTEM AND METHOD FOR ENCODING CONSTANT OPERANDS IN A WIDE ISSUE PROCESSOR";
7) Ser. No. 09/751,330, filed concurrently herewith, entitled "SYSTEM AND METHOD FOR SUPPORTING PRECISE EXCEPTIONS IN A DATA PROCESSOR HAVING A CLUSTERED ARCHITECTURE";
8) Ser. No. 09/751,674, filed concurrently herewith, entitled "CIRCUIT AND METHOD FOR INSTRUCTION COMPRESSION AND DISPERSAL IN WIDE-ISSUE PROCESSORS";
9) Ser. No. 09/751,678, filed concurrently herewith, entitled "SYSTEM AND METHOD FOR REDUCING POWER CONSUMPTION IN A DATA PROCESSOR HAVING A CLUSTERED ARCHITECTURE"; and
10) Ser. No. 09/751,679, filed 20 concurrently herewith, entitled "INSTRUCTION FETCH APPARATUS FOR WIDE ISSUE PROCESSORS AND METHOD OF OPERATION".

The above applications are commonly assigned to the assignee of the present invention. The disclosures of these related patent applications are hereby incorporated by reference for all purposes as if fully set forth herein.

TECHNICAL FIELD OF THE INVENTION

The present invention is generally directed to data processors and, more specifically, to an apparatus for stalling an instruction pipeline in a data processor after a cache miss.

BACKGROUND OF THE INVENTION

The demand for high performance computers requires that state-of-the-art microprocessors execute instructions in the minimum amount of time. A number of different approaches have been taken to decrease instruction execution time, thereby increasing processor throughput. One way to increase processor throughput is to use a pipeline architecture in which the processor is divided into separate processing stages that form the pipeline. Instructions are broken down into elemental steps that are executed in different stages in an assembly line fashion.

A pipelined processor is capable of executing several different machine instructions concurrently. This is accomplished by breaking down the processing steps for each instruction into several discrete processing phases, each of which is executed by a separate pipeline stage. Hence, each instruction must pass sequentially through each pipeline stage in order to complete its execution. In general, a given instruction is processed by only one pipeline stage at a time, with one clock cycle being required for each stage. Since instructions use the pipeline stages in the same order and typically only stay in each stage for a single clock cycle, an N stage pipeline is capable of simultaneously processing N instructions. When filled with instructions, a processor with N pipeline stages completes one instruction each clock cycle.

The execution rate of an N-stage pipeline processor is theoretically N times faster than an equivalent non-pipelined processor. A non-pipelined processor is a processor that completes execution of one instruction before proceeding to the next instruction. Typically, pipeline overheads and other factors decrease somewhat the execution rate advantage that a pipelined processor has over a non-pipelined processor.

An exemplary seven stage processor pipeline may consist of an address generation stage, an instruction fetch stage, a decode stage, a read stage, a pair of execution (E1 and E2) stages, and a write (or write-back) stage. In addition, the processor may have an instruction cache that stores program instructions for execution, a data cache that temporarily stores data operands that otherwise are stored in processor memory, and a register file that also temporarily stores data operands.

The address generation stage generates the address of the next instruction to be fetched from the instruction cache. The instruction fetch stage fetches an instruction for execution from the instruction cache and stores the fetched instruction in an instruction buffer. The decode stage takes the instruction from the instruction buffer and decodes the instruction into a set of signals that can be directly used for executing subsequent pipeline stages. The read stage fetches required operands from the data cache or registers in the register file. The E1 and E2 stages perform the actual program operation (e.g., add, multiply, divide, and the like) on the operands fetched by the read stage and generates the result. The write stage then writes the result generated by the E1 and E2 stages back into the data cache or the register file.

Assuming that each pipeline stage completes its operation in one clock cycle, the exemplary seven stage processor pipeline takes seven clock cycles to process one instruction. As previously described, once the pipeline is full, an instruction can theoretically be completed every clock cycle.

The throughput of a processor also is affected by the size of the instruction set executed by the processor and the resulting complexity of the instruction decoder. Large instruction sets require large, complex decoders in order to maintain a high processor throughput. However, large complex decoders tend to increase power dissipation, die size and the cost of the processor. The throughput of a processor also may be affected by other factors, such as exception handling, data and instruction cache sizes, multiple parallel instruction pipelines, and the like. All of these factors increase or at least maintain processor throughput by means of complex and/or redundant circuitry that simultaneously increases power dissipation, die size and cost.

In many processor applications, the increased cost, increased power dissipation, and increased die size are tolerable, such as in personal computers and network servers that use x86-based processors. These types of processors include, for example, Intel Pentium™ processors and AMD Athlon™ processors.

However, in many applications it is essential to minimize the size, cost, and power requirements of a data processor. This has led to the development of processors that are optimized to meet particular size, cost and/or power limits. For example, the recently developed Transmeta Crusoe™ processor greatly reduces the amount of power consumed by the processor when executing most x86 based programs. This is particularly useful in laptop computer applications. Other types of data processors may be optimized for use in consumer appliances (e.g., televisions, video players, radios, digital music players, and the like) and office equipment (e.g., printers, copiers, fax machines, telephone systems, and other peripheral devices). The general design objectives for data processors used in consumer appliances and office equipment are the minimization of cost and complexity of the data processor.

Another way to increase processor throughput is to use bypass circuitry in a pipeline architectures to transfer the result of a calculation or other operation from one pipeline stage to another pipeline stage before the result is finalized by writing it to a register file. For example, a first instruction may add the contents of Register A to Register B and store the resulting sum in Register C. A second and subsequent instruction may multiply the sum in Register C by 5 and store the resulting product in Register D. Without bypass circuitry, the second instruction must wait until after the sum from the first instruction is written to Register D before the second instruction can proceed. This stalls the instruction pipeline. Bypass circuitry allows the sum from the first instruction to be transferred directly from the adder that produced the sum (i.e., while the result is still in the execution stage) to one of the inputs of the multiplier addressed by the second instruction. Thus, the multiplication may occur while (or before) the sum is being written to Register C.

Unfortunately, bypassing circuitry complicates the operation of a microprocessor when a cache miss occurs. When a target address is applied to a data cache, the target address is decoded and applied to a data array and a tag array. Data from the selected entry in the data array is output from the data cache. At the same time, address bits (i.e., tags) from the selected entry in the tag array are output from the tag array and compared to the target address to determine if a cache miss or cache hit has occurred. However, due to the delay associated with the address comparison circuitry that determines if a cache miss or cache hit occurred, the data fetched from the target address in the data array may be transferred to, and stored in, other pipeline stages by the bypass circuitry before it is determined that a cache miss has occurred. The common solution to this problem is to flush the entire pipeline whenever a cache miss occurs. Unfortunately, this also results in additional delays as the pipeline stages are flushed and reloaded.

Therefore, there is a need in the art for improved pipeline architectures for use in data processors. In particular, there is a need for processor pipeline architectures that minimize delays associated with data cache misses. More particularly, there is a need for processor pipeline architectures that implement bypass circuitry that sustains a minimum performance degradation when a data cache miss occurs.

SUMMARY OF THE INVENTION

To address the above-discussed deficiencies of the prior art, it is a primary object of the present invention to provide a data processor capable of stalling the instruction execution pipeline after a cache miss and re-loading the correct cache data into any bypass devices before restarting the pipeline. According to an advantageous embodiment of the present invention, the data processor comprises: 1) an instruction execution pipeline comprising N processing stages, each of the N processing stages capable of performing one of a plurality of execution steps associated with a pending instruction being executed by the instruction execution pipeline; 2) a data cache capable of storing data values used by the pending instruction; 3) a plurality of architectural registers capable of receiving the data values from the data cache; 4) bypass circuitry capable of transferring a first data value from the data cache directly to a functional unit in one of the N processing stages without first storing the first data value in a destination one of the plurality of architectural registers; and 5) a cache refill controller capable of detecting that a cache miss has occurred at a first address associated with the first data value, receiving a missed cache line from a main memory coupled to the data processor, and causing the first data value to be transferred from the missed cache line to the functional unit.

According to one embodiment of the present invention, the cache refill controller is further capable of stalling the instruction execution pipeline after the cache miss by halting clock signals driving the instruction execution pipeline.

According to another embodiment of the present invention, the data processor further comprises a clock controller coupled to the cache refill controller and capable of generating the clock signals driving the instruction execution pipeline, wherein the clock controller stalls the instruction execution pipeline by halting the clock signals in response to a command from the cache refill controller.

According to still another embodiment of the present invention, the cache refill controller causes the first data value to be transferred to the functional unit when the instruction execution pipeline is stalled.

According to yet another embodiment of the present invention, the cache refill controller is further capable of storing the missed cache line into the data cache.

According to a further embodiment of the present invention, the cache refill controller causes the first data value to be transferred to the functional unit by retrieving the first data value from the missed cache line stored in the data cache.

According to a still further embodiment of the present invention, the cache refill controller causes the first data value to be transferred to the functional unit after the cache miss via the bypass circuitry.

According to a yet further embodiment of the present invention, the clock controller generates an early clock signal when the execution pipeline is stalled, wherein the early clock signal causes the first data value to be transferred to the functional unit from the data cache.

In one embodiment of the present invention, the cache refill controller restarts the instruction execution pipeline after the clock controller generates the early clock signal.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data processor.

Figure 1:
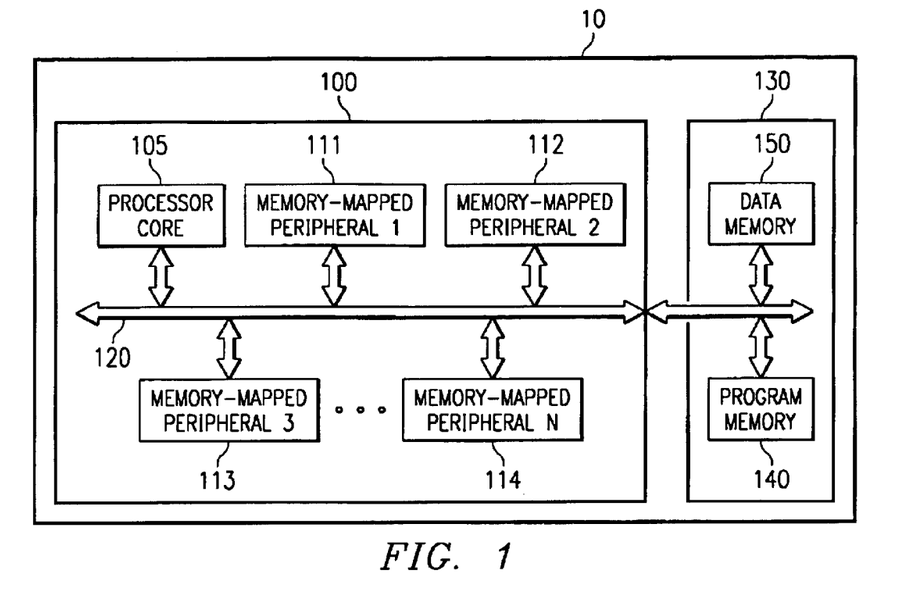
FIG. 1 is a block diagram of a processing system that contains a data processor in accordance with the principles of the present invention.

FIG. 1 is a block diagram of processing system 10, which contains data processor 100 in accordance with the principles of the present invention. Data processor 100 comprises processor core 105 and N memory-mapped peripherals interconnected by system bus 120. The N memory-mapped peripherals include exemplary memory-mapped peripherals 111–114, which are arbitrarily labeled Memory-Mapped Peripheral 1, Memory-Mapped Peripheral 2, Memory-Mapped Peripheral 3, and Memory-Mapped Peripheral N. Processing system 10 also comprises main memory 130. In an advantageous embodiment of the present invention, main memory 130 may be subdivided into program memory 140 and data memory 150.

The cost and complexity of data processor 100 is minimized by excluding from processor core 105 complex functions that may be implemented by one or more of memory-mapped peripherals 111–114. For example, memory-mapped peripheral 111 may be a video codec and memory-mapped peripheral 112 may be an audio codec. Similarly, memory-mapped peripheral 113 may be used to control cache flushing. The cost and complexity of data processor 100 is further minimized by implementing extremely simple exception behavior in processor core 105, as explained below in greater detail.

Processing system 10 is shown in a general level of detail because it is intended to represent any one of a wide variety of electronic devices, particularly consumer appliances. For example, processing system 10 may be a printer rendering system for use in a conventional laser printer. Processing system 10 also may represent selected portions of the video and audio compression-decompression circuitry of a video playback system, such as a video cassette recorder or a digital versatile disk (DVD) player. In another alternative embodiment, processing system 10 may comprise selected portions of a cable television set-top box or a stereo receiver. The memory-mapped peripherals and a simplified processor core reduce the cost of data processor 100 so that it may be used in such price sensitive consumer appliances.

In the illustrated embodiment, memory-mapped peripherals 111–114 are shown disposed within data processor 100 and program memory 140 and data memory 150 are shown external to data processor 100. It will be appreciated by those skilled in the art that this particular configuration is shown by way of illustration only and should not be construed so as to limit the scope of the present invention in any way. In alternative embodiments of the present invention, one or more of memory-mapped peripherals 111–114 may be externally coupled to data processor 100. Similarly, in another embodiment of the present invention, one or both of program memory 140 and data memory 150 may be disposed on-chip in data processor 100.

Figure 2:
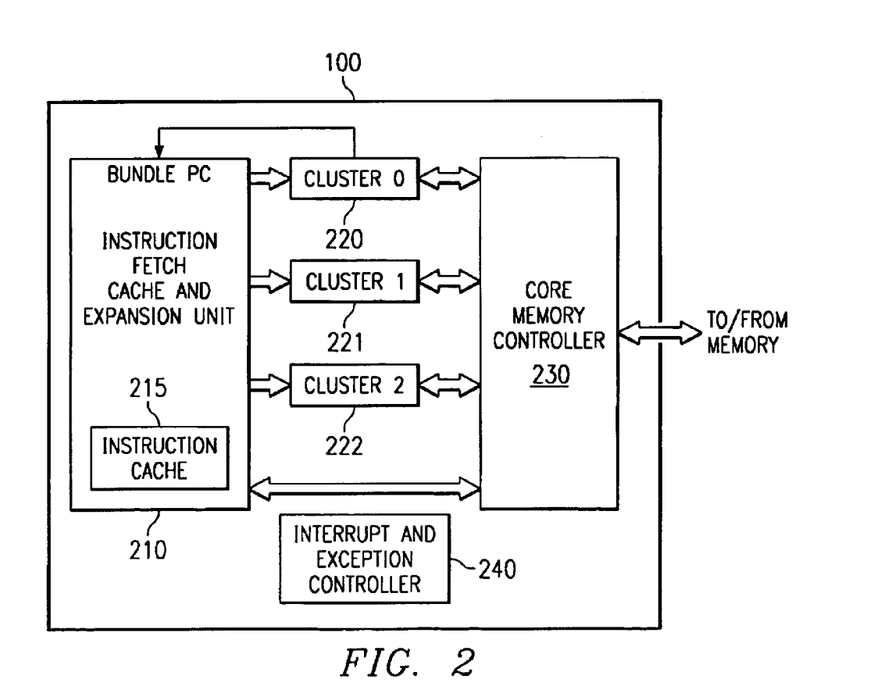
FIG. 2 illustrates the exemplary data processor in greater detail according to one embodiment of the present invention.

FIG. 2 is a more detailed block diagram of exemplary data processor 100 according to one embodiment of the present invention. Data processor 100 comprises instruction fetch cache and expansion unit (IFCEXU) 210, which contains instruction cache 215, and a plurality of clusters, including exemplary clusters 220–222. Exemplary clusters 220–222 are labeled Cluster 0, Cluster 1 and Cluster 2, respectively. Data processor 100 also comprises core memory controller 230 and interrupt and exception controller 240.

A fundamental object of the design of data processor 100 is to exclude from the core of data processor 100 most of the functions that can be implemented using memory-mapped peripherals external to the core of data processor 100. By way of example, in an exemplary embodiment of the present invention, cache flushing may be efficiently accomplished using software in conjunction with a small memory-mapped device. Another object of the design of data processor 100 is to implement a statically scheduled instruction pipeline with an extremely simple exception behavior.

Clusters 220–222 are basic execution units that comprise one more arithmetic units, a register file, an interface to core memory controller 230, including a data cache, and an inter-cluster communication interface. In an exemplary embodiment of the present invention, the core of data processor 100 may comprise only a single cluster, such as exemplary cluster 220.

Because conventional processor cores can execute multiple simultaneously issued operations, the traditional word "instruction" is hereby defined with greater specificity. For the purposes of this disclosure, the following terminology is adopted. An "instruction" or "instruction bundle" is a group of simultaneously issued operations encoded as "instruction syllables". Each instruction syllable is encoded as a single machine word. Each of the operations constituting an instruction bundle may be encoded as one or more instruction syllables. Hereafter, the present disclosure may use the shortened forms "instruction" and "bundle" interchangeably and may use the shortened form "syllable." In an exemplary embodiment of the present invention, each instruction bundle consists of 1 to 4 instruction syllables. Flow control operations, such as branch or call, are encoded in single instruction syllables.

Figure 3:
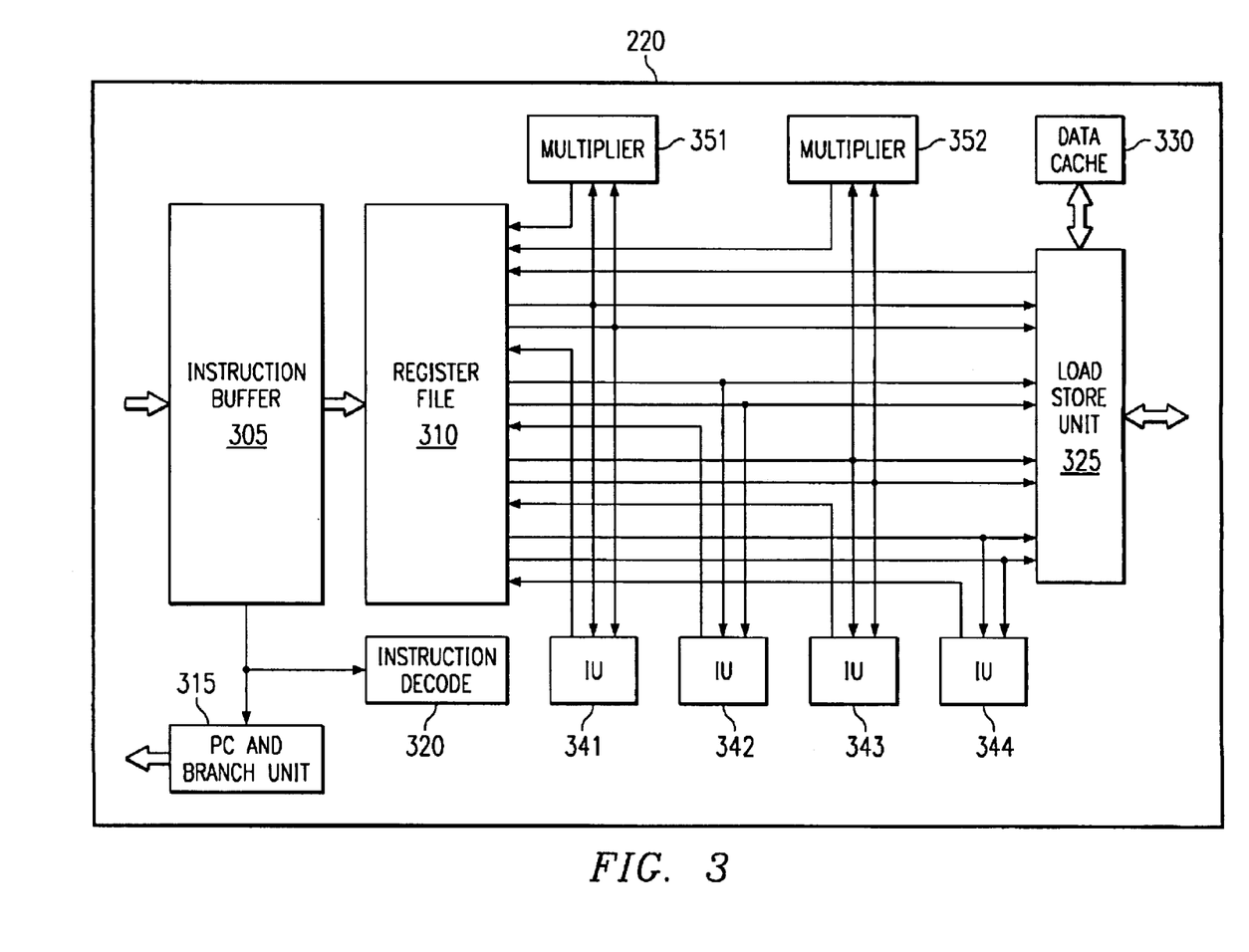
FIG. 3 illustrates a cluster in the exemplary data processor according to one embodiment of the present invention.

FIG. 3 is a more detailed block diagram of cluster 220 in data processor 100 according to one embodiment of the present invention. Cluster 220 comprises instruction buffer 305, register file 310, program counter (PC) and branch unit 315, instruction decoder 320, load store unit 325, data cache 330, integer units 341–344, and multipliers 351–352. Cluster 220 is implemented as an instruction pipeline.

Instructions are issued to an operand read stage associated with register file 310 and then propagated to the execution units (i.e., integer units 341–244, multipliers 351–352). Cluster 220 accepts one bundle comprising one to four syllables in each cycle. The bundle may consist of any combination of four integer operations, two multiplication operations, one memory operation (i.e., read or write) and one branch operation. Operations that require long immediates (constants) require two syllables.

In specifying a cluster, it is assumed that no instruction bits are used to associate operations with functional units. For example, arithmetic or load/store operations may be placed in any of the four words encoding the operations for a single cycle. This may require imposing some addressing alignment restrictions on multiply operations and long immediates (constants).

This following describes the architectural (programmer visible) status of the core of data processor 100. One design objective of data processor 100 is to minimize the architectural status. All non-user visible status information resides in a memory map, in order to reduce the number of special instructions required to access such information.

Program Counter

In an exemplary embodiment of the present invention, the program counter (PC) in program counter and branch unit 315 is a 32-bit byte address pointing to the beginning of the current instruction bundle in memory. The two least significant bits (LSBs) of the program counter are always zero. In operations that assign a value to the program counter, the two LSBs of the assigned value are ignored.

Register File 310

In an exemplary embodiment, register file 310 contains 64 words of 32 bits each. Reading Register 0 (i.e., R0) always returns the value zero.

Link Register

Register 63 (i.e., R63) is used to address the link register by the call and return instructions. The link register (LR) is a slaved copy of the architecturally most recent update to R63. R63 can be used as a normal register, between call and return instructions. The link register is updated only by writes to R63 and the call instruction. At times the fact that the link register is a copy of R63 and not R63 itself may be visible to the programmer. This is because the link register and R63 get updated at different times in the pipeline. Typically, this occurs in the following cases:

1) ICALL and IGOTO instructions—Since these instructions are executed in the decode stage, these operations require that R63 be stable. Thus, R63 must not be modified in the instruction bundle preceding one of these operations. Otherwise unpredictable results may occur in the event of an interrupt; and 2) An interrupt or exception may update the link register incorrectly. Thus, all interrupt and exception handlers must explicitly write R63 prior to using the link register through the execution of an RFI, ICALL or IGOTO instruction. This requirement can be met with a simple MOV instruction from R63 to R63.

Branch Bit File

The branch architecture of data processor 100 uses a set of eight (8) branch bit registers (i.e., B0 through B7) that may be read or written independently. In an exemplary embodiment of the present invention, data processor 100 requires at least one instruction to be executed between writing a branch bit and using the result in a conditional branch operation.

Control Registers

A small number of memory mapped control registers are part of the architectural state of data processor 100. These registers include support for interrupts and exceptions, and memory protection.

The core of data processor 100 is implemented as a pipeline that requires minimal instruction decoding in the early pipeline stages. One design objective of the pipeline of data processor 100 is that it support precise interrupts and exceptions. Data processor 100 meets this objective by updating architecturally visible state information only during a single write stage. To accomplish this, data processor 100 makes extensive use of register bypassing circuitry to minimize the performance impact of meeting this requirement.

Figure 4:
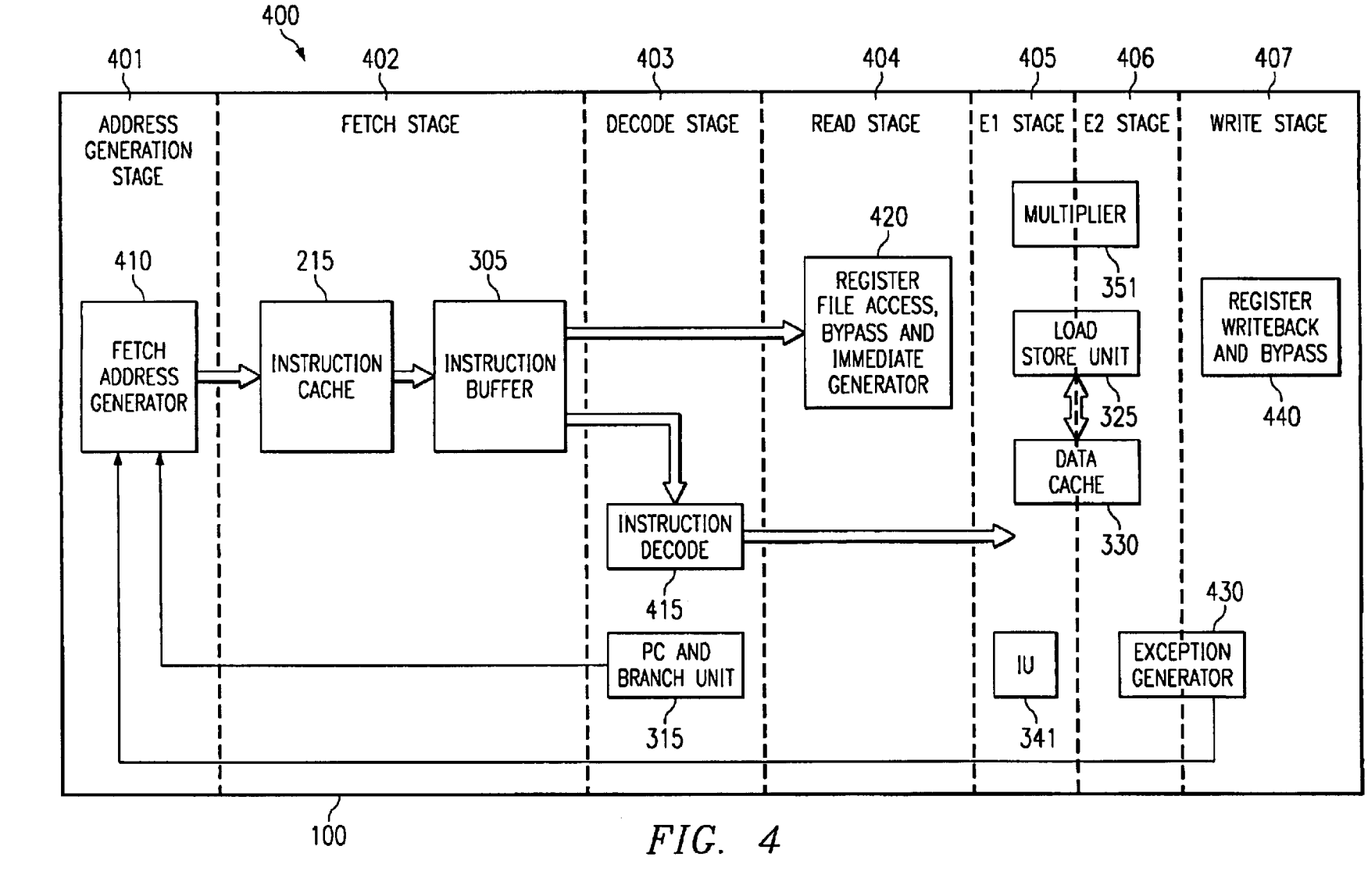
FIG. 4 illustrates the operational stages of the exemplary data processor according to one embodiment of the present invention.

FIG. 4 is a block diagram illustrating the operational stages of pipeline 400 in exemplary data processor 100 according to one embodiment of the present invention. In the illustrated embodiment, the operational stages of data processor 100 are address generation stage 401, fetch stage 402, decode stage 403, read stage 404, first execution (E1) stage 405, second execution (E2) stage 406 and write stage 407.

Address Generation Stage 401 and Fetch Stage 402

Address generation stage 401 comprises a fetch address generator 410 that generates the address of the next instruction to be fetched from instruction cache 215. Fetch address generator 410 receives inputs from exception generator 430 and program counter and branch unit 315. Fetch address generator 410 generates an instruction fetch address (FADDR) that is applied to instruction cache 215 in fetch stage 402 and to an instruction protection unit (not shown) that generates an exception if a protection violation is found. Any exception generated in fetch stage 402 is postponed to write stage 407. Instruction buffer 305 in fetch stage 402 receives instructions as 128-bit wide words from instruction cache 215 and the instructions are dispatched to the cluster.

Decode Stage 403

Decode stage 403 comprises instruction decode block 415 and program counter (PC) and branch unit 315. Instruction decode block 415 receives instructions from instruction buffer 305 and decodes the instructions into a group of control signals that are applied to the execution units in E1 stage 405 and E2 stage 406. Program counter and branch unit 315 evaluates branches detected within the 128-bit wide words. A taken branch incurs a one cycle delay and the instruction being incorrectly fetched while the branch instruction is evaluated is discarded.

Read Stage 404

In read stage 404, operands are generated by register file access, bypass and immediate (constant) generation block 420. The sources for operands are the register files, the constants (immediates) assembled from the instruction bundle, and any results bypassed from operations in later stages in the instruction pipeline.

E1 Stage 405 and E2 Stage 406

The instruction execution phase of data processor 100 is implemented as two stages, E1 stage 405 and E2 stage 406 to allow two cycle cache access operations and two cycle multiplication operations. Exemplary multiplier 351 is illustrated straddling the boundary between E1 stage 405 and E2 stage 406 to indicate a two cycle multiplication operation. Similarly, load store unit 325 and data cache 330 are illustrated straddling the boundary between E1 stage 405 and E2 stage 406 to indicate a two cycle cache access operation. Integer operations are performed by integer units, such as IU 341 in E1 stage 405. Exceptions are generated by exception generator 430 in E2 stage 406 and write stage 407.

Results from fast operations are made available after E1 stage 405 through register bypassing operations. An important architectural requirement of data processor 100 is that if the results of an operation may be ready after E1 stage 405, then the results are always ready after E1 stage 405. In this manner, the visible latency of operations in data processor 100 is fixed.

Write Stage 407

At the start of write stage 407, any pending exceptions are raised and, if no exceptions are raised, results are written by register write back and bypass block 440 into the appropriate register file and/or data cache location. In data processor 100, write stage 407 is the "commit point" and operations reaching write stage 407 in the instruction pipeline and not "excepted" are considered completed. Previous stages (i.e., address generation, fetch, decode, read, E1, E2) are temporally prior to the commit point. Therefore, operations in address generation stage 401, fetch stage 402, decode stage 403, read stage 404, E1 stage 405 and E2 stage 406 are flushed when an exception occurs and are acted upon in write stage 407.

According to an advantageous embodiment of the present invention, data processor 100 comprises bypass circuitry in order to maximize processor throughput. The bypass circuitry allows a data result in the instruction pipeline to be transferred from one stage to another stage without requiring the data result to be written to a destination register. For example, data processor 100 uses bypass circuitry in E2 stage 406 to transfer data fetched from data cache 330 to, for example, read stage 404 or E1 stage 405 while the fetched data is still being written to a destination register during write stage 407. In order to minimize the delay attendant to a data cache miss, the present invention implements a pipeline stall after a data cache miss. During the stall, the present invention executes a special procedure that removes incorrect data that was erroneously bypassed to devices in other pipeline stages prior to the detection of the cache miss. The present invention then uses a special clock cycle to transfer the correct data retrieved from memory after the data cache miss via the bypass circuitry to the devices in the other pipeline stages.

Figure 5:
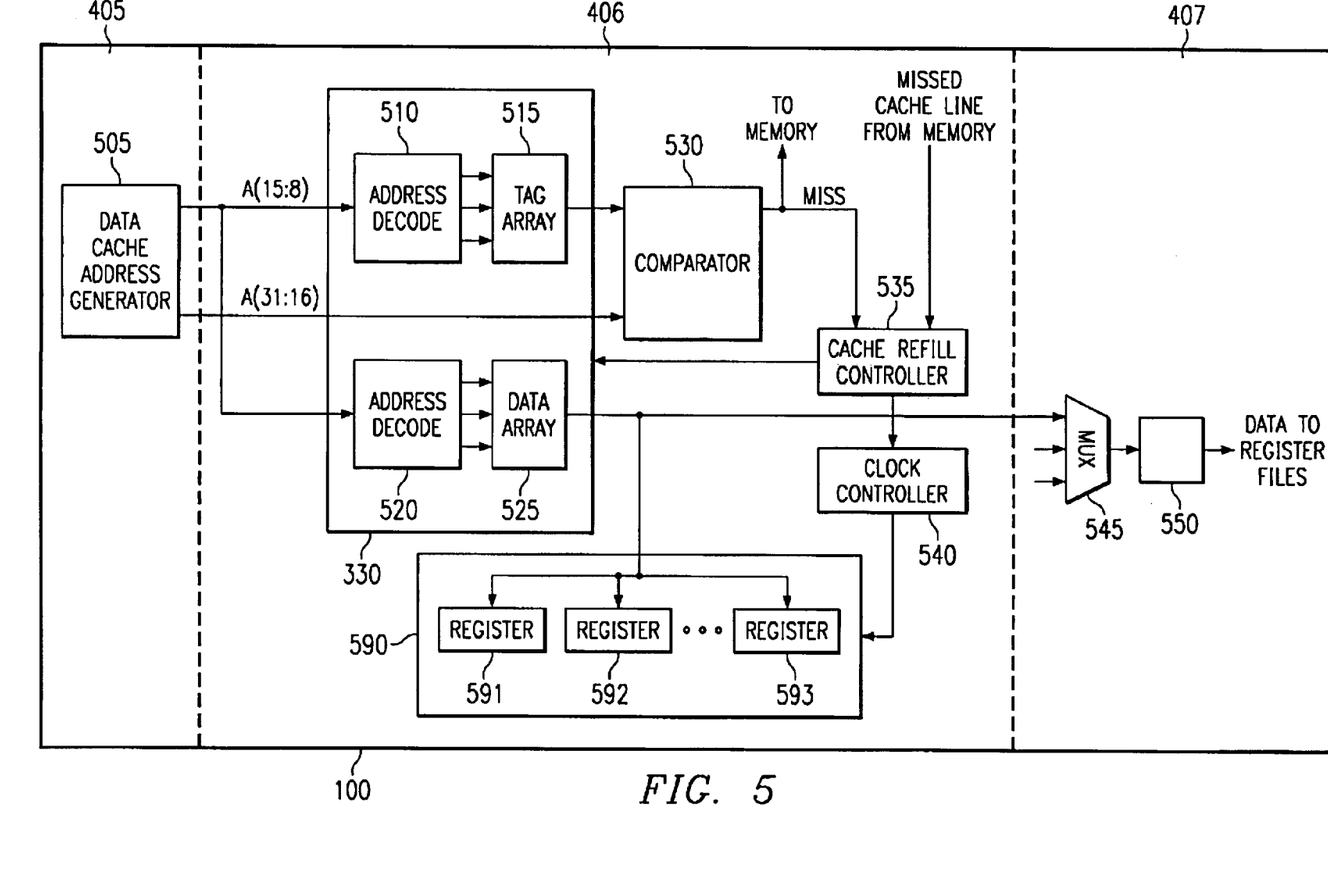
FIG. 5 is a block diagram illustrating selected portions of the pipeline stall circuitry in the exemplary data processor according to one embodiment of the present invention.

FIG. 5 is a block diagram illustrating selected portions of the pipeline stall circuitry in data processor 100 according to one embodiment of the present invention. In E1 stage 405, data cache address generation block 505 generates the 32-bit address of the data to be loaded from data cache 330 into a destination register file. In E2 stage 406, data cache 330 comprises address decoder 510, address decoder 520, tag array 515 and data array 525. E2 stage 406 also contains comparator 530, cache refill controller 535, clock controller 540, and bypass circuitry 590.

In the exemplary embodiment, each cache line in data cache array comprises 256 bytes of data. The eight least significant bits of the address, A(7:0), are used to select data at the byte, word and double word level within a cache line. Address decoder 510 decodes address bits A(15:8) to select lines in tag array 515. Address decoder 520 decodes address bits A(15:8) to select lines in data array 525. During load store operations, the data fetched from data array 525 is transferred to a destination register via multiplexer (MUX) 545 and latch 550 in write stage 550.

However, any byte, word, or double word that is fetched from data array 525 in data cache 330 may also be bypassed to one or more devices in other stages of the instruction pipeline. For the purposes of simplicity in explaining the operation of the present operation, these bypass devices are collectively shown as N registers in bypass circuitry 590, including exemplary registers 591, 592, and 593.

Figure 6:
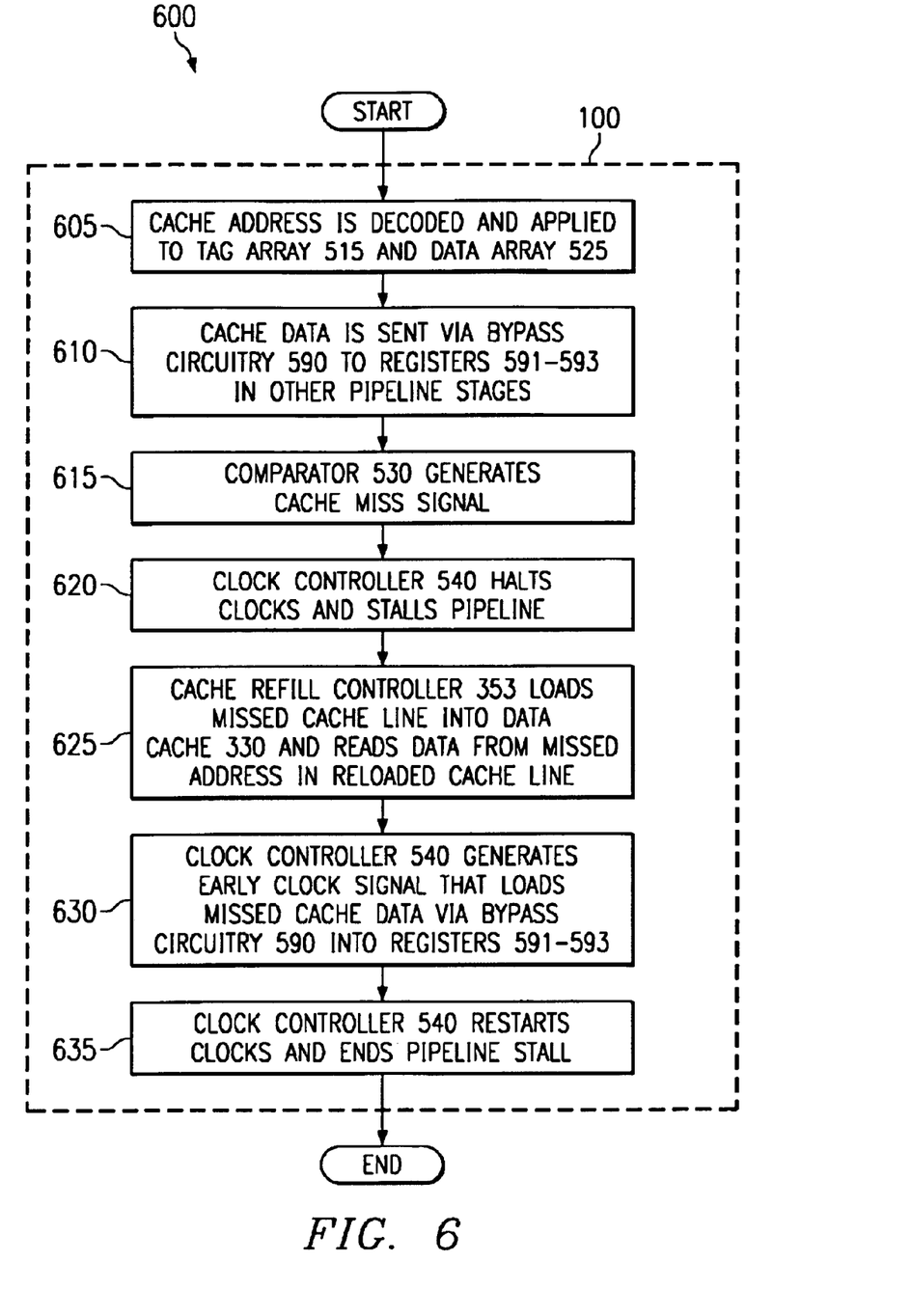
FIG. 6 is a flow diagram illustrating the operation of the exemplary pipeline stall circuitry according to one embodiment of the present invention.

FIG. 6 depicts flow diagram 600, which illustrates the operation of the exemplary pipeline stall circuitry in data processor 100 according to one embodiment of the present invention. Initially, a cache address is decoded and applied to tag array 515 and data array 525 (process step 605). Data retrieved from data array 525 (i.e., cache data) is sent via bypass circuitry 590 to one or more of registers 591–593 (process step 610). If a cache miss has occurred, this results in the storage of corrupt data in registers 591–593. Simultaneously, tag data retrieved from tag array 515 is compared to address bits A(31:16) by comparator 530 to determine if a cache miss has occurred. If the tag data does not match A(31:16), comparator 530 generates a cache MISS signal (process step 615).

The cache MISS signal is transmitted to main memory and to cache refill controller 535. Cache refill controller 535 notifies clock controller 540 that a cache miss has occurred and clock controller 540 halts all pipeline clocks in order to stall the pipeline (process step 620) Cache refill controller 535 receives the missed cache line from main memory and loads the missed cache line into data array 525 in data cache 330. Cache refill controller 535 also re-reads data from the missed address in the newly reloaded cache line (process step 625).

When the missed data is finally output from data array 525, clock controller 540 generates an early clock signal that loads the missed cache data into one or more of registers 591–593 via bypass circuitry 590 (process step 630). At this point the corrupt data in registers 591–593 has been replaced by the correct data from the missed cache address. Clock controller 540 then restarts all clocks in the instruction pipeline and the pipeline stall is ended (process step 635).

Although the present invention has been described in detail, those skilled in the art should understand that they can make various changes, substitutions and alterations herein without departing from the spirit and scope of the invention in its broadest form.

What is claimed is:

1. A data processor comprising:

an instruction execution pipeline comprising N processing stages, each of said N processing stages capable of performing one of a plurality of execution steps associated with a pending instruction being executed by said instruction execution pipeline;

a data cache capable of storing data values used by said pending instruction;

a plurality of architectural registers capable of receiving said data values from said data cache;

bypass circuitry capable of transferring a first data value regardless of a cache miss from said data cache directly to a functional unit in one of said N processing stages without first storing said first data value in a destination one of said plurality of architectural registers; and a cache refill controller capable of detecting that a cache miss has occurred at a first address associated with said first data value, receiving a missed cache line from a main memory coupled to said data processor, and causing a second data value to be transferred from said missed cache line to said functional unit to replace said first data value.

2. The data processor as set forth in claim 1 wherein said cache refill controller is further capable of stalling said instruction execution pipeline after said cache miss by halting clock signals driving said instruction execution pipeline.

3. The data processor as set forth in claim 2 further comprising a clock controller coupled to said cache refill controller and capable of generating said clock signals driving said instruction execution pipeline, wherein said clock controller stalls said instruction execution pipeline by halting said clock signals in response to a command from said cache refill controller.

4. The data processor as set forth in claim 3 wherein said cache refill controller causes said second data value to be transferred to said functional unit when said instruction execution pipeline is stalled.

5. The data processor as set forth in claim 4 wherein said cache refill controller is further capable of storing said missed cache line into said data cache.

6. The data processor as set forth in claim 5 wherein said cache refill controller causes said second data value to be transferred to said functional unit by retrieving said second data value from said missed cache line stored in said data cache.

7. The data processor as set forth in claim 6 wherein said cache refill controller causes said second data value to be transferred to said functional unit after said cache miss via said bypass circuitry.

8. The data processor as set forth in claim 7 wherein said clock controller generates an early clock signal when said execution pipeline is stalled, wherein said early clock signal causes said second data value to be transferred to said functional unit from said data cache.

9. The data processor as set forth in claim 8 wherein said cache refill controller restarts said instruction execution pipeline after said clock controller generates said early clock signal.

10. A processing system comprising:

a data processor;

a memory coupled to said data processor;

a plurality of memory-mapped peripheral circuits coupled to said data processor for performing selected functions in association with said data processor, wherein said data processor comprises:

an instruction execution pipeline comprising N processing stages, each of said N processing stages capable of performing one of a plurality of execution steps associated with a pending instruction being executed by said instruction execution pipeline;

a data cache capable of storing data values used by said pending instruction;

a plurality of architectural registers capable of receiving said data values from said data cache;

bypass circuitry capable of transferring a first data value regardless of a cache miss, from said data cache directly to a functional unit in one of said N processing stages without first storing said first data value in a destination one of said plurality of architectural registers; and a cache refill controller capable of detecting that a cache miss has occurred at a first address associated with said first data value, receiving a missed cache line from a main memory coupled to said data processor, and causing a second data value to be transferred from said missed cache line to said functional unit to replace said first data value.

11. The processing system as set forth in claim 10 wherein said cache refill controller is further capable of stalling said instruction execution pipeline after said cache miss by halting clock signals driving said instruction execution pipeline.

12. The processing system as set forth in claim 11 further comprising a clock controller coupled to said cache refill controller and capable of generating said clock signals driving said instruction execution pipeline, wherein said clock controller stalls said instruction execution pipeline by halting said clock signals in response to a command from said cache refill controller.

13. The processing system as set forth in claim 12 wherein said cache refill controller causes said second data value to be transferred to said functional unit when said instruction execution pipeline is stalled.

14. The processing system as set forth in claim 13 wherein said cache refill controller is further capable of storing said missed cache line into said data cache.

15. The processing system as set forth in claim 14 wherein said cache refill controller causes said second data value to be transferred to said functional unit by retrieving said second data value from said missed cache line stored in said data cache.

16. The processing system as set forth in claim 15 wherein said cache refill controller causes said second data value to be transferred to said functional unit after said cache miss via said bypass circuitry.

17. The processing system as set forth in claim 16 wherein said clock controller generates an early clock signal when said execution pipeline is stalled, wherein said early clock signal causes said second data value to be transferred to said functional unit from said data cache.

18. The processing system as set forth in claim 17 wherein said cache refill controller restarts said instruction execution pipeline after said clock controller generates said early clock signal.

19. For use in a data processor comprising 1) an instruction execution pipeline comprising N processing stages, each of the N processing stages capable of performing one of a plurality of execution steps associated with a pending instruction being executed by the instruction execution pipeline, and 2) bypass circuitry capable of transferring a first data value regardless of cache miss, from a data cache directly to a functional unit in one of the N processing stages without first storing the first data value in a destination architectural register, a method of handling a cache miss comprising the steps of:

detecting that a cache miss has occurred at a first address associated with the first data value;

stalling the operation of the instruction execution pipeline;

receiving a missed cache line from a main memory coupled to the data processor;

transferring a second data value from the missed cache line to the functional unit to replace the first data value.

20. The method as set forth in claim 19 wherein the step of stalling comprises the sub-step of halting clock signals driving the instruction execution pipeline.

21. The method as set forth in claim 20 further comprising the step of storing the missed cache line into the data cache.

22. The method as set forth in claim 21 wherein the step of transferring comprises the sub-step of retrieving the second data value from the missed cache line stored in the data cache.

23. The method as set forth in claim 22 wherein the step of transferring further comprises the sub-step of transferring the second data value to the functional unit after the cache miss via the bypass circuitry.

24. The method as set forth in claim 23 further comprising the step of restarting the instruction execution pipeline after completion of the sub-step of transferring the second data value to the functional unit after the cache miss via the bypass circuitry.

* * * * *